July 10, 1962 E. KENK 3,043,346
WEFT THREAD CUTTING DEVICE
Filed June 15, 1960

INVENTOR
Erhard Kenk
BY Michael S. Striker
his ATTORNEY

United States Patent Office 3,043,346
Patented July 10, 1962

3,043,346
WEFT THREAD CUTTING DEVICE
Erhard Kenk, Vaihingen (Enz) Nord,
Wurttemberg, Germany
Filed June 15, 1960, Ser. No. 36,285
Claims priority, application Great Britain June 15, 1959
10 Claims. (Cl. 139—303)

The present invention relates to a weft thread cutting device which is mounted on the temple of an automatic loom for removing the weft threads directly on the edge of fabric and is of the type consisting of a cutter block which extends substantially perpendicular to the web of fabric, engages the same with the edge thereof and is provided with notches extending substantially parallel to the web of fabric, and of a pinlike cutting bolt which is adapted to reciprocate within a bore in the cutter block and during its downward movement to pass transversely into the notches and thereby to cut off the threads which have entered into the same. In a known device of this type, the cutter block is of a tubular shape and this tube is closed except for the notches in the wall thereon. In the operation of this known device it has been found that fibers of the cut-off threads might accumulate in the bore of the cutter block and clog the same with the result that the cutting pin may become seized in the bore and may thereby render the cutting device inoperative.

It is an object of the present invention to overcome this disadvantage in a very simple manner by making the notches in the wall of the cutter block and by providing the notched outer surface of this wall with a slot, which is narrower than the diameter of the bore in which the cutting pin is slidable, and extends parallel to the bore and through the wall thereof and transversely of the outer ends of the teeth forming the notches. The provision of this slot has the advantage that the thread fibers will be ejected from the bore of the cutter block and cannot interfere with the movement of the cutting pin.

The cutting device according to the invention is preferably designed so that the cutter block has a prismatic shape in which one side thereof extends parallel to the edge of the fabric, while the side which is provided with the notches extends perpendicularly thereto. In order to insure that the threads will be cut off as closely as possible along the edge of the fabric, the bore in the cutter block in which the cutting pin is guided may be offset toward the side which engages with the fabric edge.

In order to prevent at a possible breakage of the cutting pin that the broken parts theerof might drop through the open end of the bore in the cutter block into the loom where it might damage the reciprocating slay, the cutter block is preferably provided at the lower end of the bore with a wall portion extending transversely to the bore and covering the open end thereof.

The invention further provides that, in order to cut off the threads as neatly as possible and thus to prevent them from being shredded, the cutting device may also be designed so that the edge portion of the end surface of the cutting pin opposite to the edge thereof facing toward the fabric edge projects from the latter edge in the direction of the cutting movement of the pin. Thus, for example, the end surface of the cutting pin may extend at an angle of about 13° relative to the horizontal plane.

According to a preferred embodiment of the invention, the thread to be cut may be guided on the end surface of the cutting pin by providing this end surface with a groove of a V-shaped cross section with an obliquely inclined front edge which preferably extends likewise at an angle of about 13° to the horizontal plane. This groove may be tapering from the side of the block facing toward the fabric edge to the opposite side so as to narrow down to the size of a small furrow into which the thread will engage when being cut. This furrowlike groove in the end surface of the cutting pin may also be continued for a certain distance in the axial direction along the side of the pin opposite to that facing toward the fabric edge.

These objects, features, and advantages of the present invention will become further apparent from the following detailed description thereof, particularly when the same is read with reference to the accompanying drawings, in which—

FIGURE 7 shows a side view of the lower end of the cutting pin; while

FIGURE 8 shows a front view, partly in section, of the cutting pin according to FIGURE 7.

Figure 1:
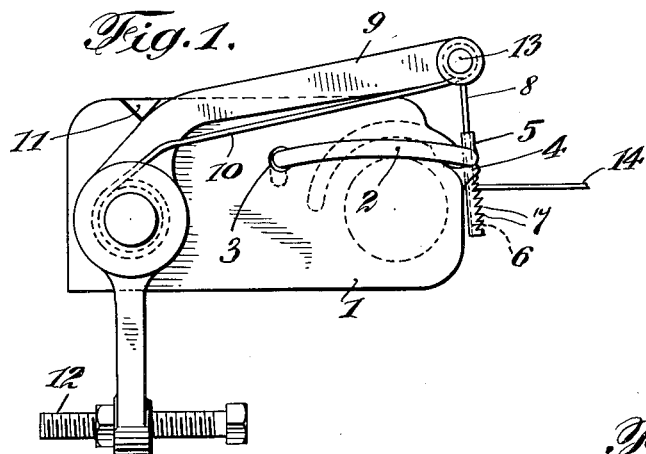
FIGURE 1 shows a side view of a temple with a cutting device according to the invention.

As illustrated in FIGURE 1, the temple base 1 of a loom is provided with a U-shaped bracket 2, one arm of which is guided in a bore 3 in the base 1, while the other arm rests on a support 4. The bore 3 and the support 4 are slightly inclined toward the temple base 1 so that the bracket has a slightly oblique position. Bracket 2 carries a cutter block 5 which extends perpendicular or nearly perpendicular to the bracket 2. Cutter block 5 is provided with a continuous bore 6 in the axial direction thereof. Near the lower end of cutter block 5 a plurality of saw-tooth shaped notches 7 are provided each of which extends to a point lying within the central longitudinal plane of bore 6. This bore 6 forms a channel in which a steel cutting pin 8 is freely slidable in the longitudinal direction. When pin 8 is in its inactive position, the end surface thereof will be substantially at the level of the uppermost notch 7.

A bell crank 9 is pivotably mounted on base 1 and pressed by a torsion spring 10 against a stop 11. The lower arm of bell crank 9 which is bent downwardly at an angle carries a setscrew 12 which is disposed within the range of the stroke of the reciprocating slay, not shown. At the side facing toward base 1, the upper end of bell crank 9 carries a pin 13 which extends parallel to the axis of rotation of the bell crank. The upper end of the cutting pin 8 forms an eye which is slidable and rotatable on pin 13 to suspend pin 8 thereon.

The manner of operation of the cutting device is as follows: When the slay advances beyond its forward dead center position, the slay beam abuts against setscrew 12 on bell crank 9 and thereby pivots the same about its axis. Cutting pin 8 is then moved downwardly. When the slay returns, bell crank 9 and cutting pin 8 will also be returned to their initial position by torsion spring 10. The downward and upward movements of cutting pin 8 take place at every stroke of the slay. After the changing of the bobbin, the change threads travel with the fabric into the temple. The threads on the selvedge 14 of the fabric then strike on the edge cutter block 5 and pass into one of the notches 7. At the following downward movement of cutting pin 8, the end surface thereof cuts through both change threads.

Figure 2:
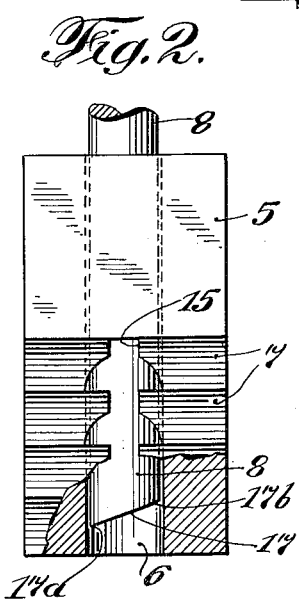
FIGURE 2 shows on a larger scale and partly in section a front view of the cutter block and the lower end of the cutting pin.
Figure 3:
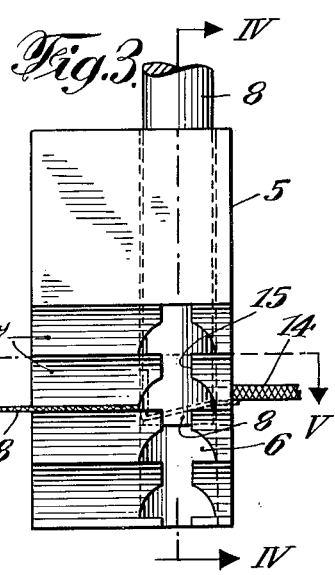
FIGURE 3 shows a view similar to FIGURE 2 of a modification of the invention, in which the bore in the cutter block is offset toward one side.
Figure 4:
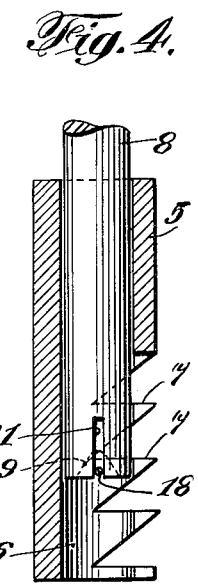
FIGURE 4 shows a longitudinal section taken along line IV—IV of FIGURE 3.
Figure 6:
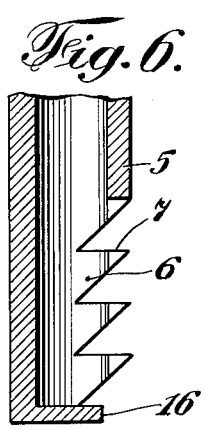
FIGURE 6 shows a longitudinal section of a further modification of the cutter block.
Figure 5:
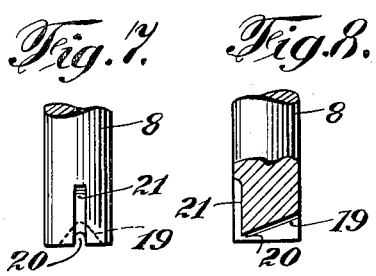
FIGURE 5 shows a cross section taken along line V—V of FIGURE 3.
Figures 7, 8:

FIGURES 2 to 8 illustrate various details of the cutter block 5 and cutting pin 8. Cutter block 5 is made of a prismatic shape and preferably of a rectangular cross section, and the notches 7 are disposed on the wider side of the cutter block. The longitudinal bore 6 may extend either centrally of cutter block 5, as shown in FIGURE 2, or it may be offset toward the side on which the edge 14 of the fabric engages, as shown in FIGURE 3. At the side of cutter block 5 containing the notches 7, and extending transversely through the walls thereof, a longitudinal groove 15 is provided centrally in front of bore 6 and extending into the same. In the modification of the cutter block 5 as illustrated in FIGURE 6, the lower end of bore 6 is closed by an end wall 16.

In the embodiment of the cutting pin 8 as shown in FIGURE 2, the end surface 17 thereof is inclined to the horizontal plane so as to extend at an angle of about 13° thereto. Cutting pin 8 is then disposed in bore 6 so that its downwardly projecting edge 17a will lie at the side opposite to that on which the edge of the fabric engages. Thus, when the cutting pin 8 moves downwardly, the left edge 17a of the end surface 17 will first engage with the thread 18 to be cut, as indicated in FIGURE 3, and will tighten the thread at the further downward movement of the cutting pin. The thread 18 then exerts a pressure upon cutting pin 8 in the direction toward edge 17b so that this edge will engage tightly on the inner wall of bore 6 and neatly cut off the thread 18 when it slides past the cutting edges of cutter block 5 which are formed by the notches 7.

In the embodiment of cutting pin 8 as illustrated in FIGURES 3, 4, 5, 7, and 8, the end surface thereof is provided with a transverse groove 19, the inner edge of which again extends at an angle of about 13° to the end surface of the pin. Also in this case, the cutting pin 8 is disposed in such a position in bore 6 that the apex of this angle points toward the left, as seen in FIGURE 3. This groove 19 narrows down toward its apex where it forms a narrow furrow 20 of a semicircular cross section. Furthermore, this side of cutting pin 8 is also provided with a narrow longitudinal groove 21.

The cutting operation proceeds similar to that as described with reference to FIGURE 2. The thread 18 to be cut engages into groove 19 and is held in place by the recess 20. Groove 21 prevents the thread 18 from being clamped at this side of cutting pin 8 between the latter and cutter block 5.

Although my invention has been illustrated and described with reference to the preferred embodiments thereof, I wish to have it understood that it is in no way limited to the details of such embodiments, but is capable of numerous modifications wtihin the scope of the appended claims.

Having thus fully disclosed my invention, what I claim is:

1. In a weft-thread cutting device mounted on a temple of a loom and comprising a cutter block having a longitudinal bore therein and adapted to engage the edge of the fabric and extending substantially perpendicular to the web of the fabric, and having in one outer wall thereof a plurality of saw-tooth shaped notches extending through said wall into said bore, and a cutting pin adapted to reciprocate within said bore and guided by the wall thereof said cutting pin having an end surface, said notches during the movement of said pin to cut off the threads within said notches, said end surface being formed with a groove adapted to receive a thread located in one of said notches, said groove having an inclined bottom adapted to cut the thread at the deepest point thereof, said outer wall also having a longitudinal slot extending parallel to and into said bore through the teeth formed between said notches and having a width smaller than the diameter of said bore.

2. In a weft thread cutting device, an arrangement as defined in claim 1, in which said cutter block has a prismatic shape with one side thereof adapted to extend parallel to the fabric edge and with the side having said notches therein extending substantially perpendicular thereto.

3. In a weft thread cutting device, an arrangement as defined in claim 1, in which said groove tapers down from one side of said cutting pin, which side is adapted to face toward the fabric edge, toward the opposite side to and has at said opposite side a cross-section adapted to match a thread to be cut.

4. In a weft thread cutting device, an arrangement as defined in claim 1, in which one side of the cutting pin at a point opposite to another side, which is adapted to face toward the fabric edge has a narrow groove therein extending in the longitudinal direction of said pin to said end surface.

5. In a weft thread cutting device, an arrangement as defined in claim 3, in which said furrow in said lower end surface continues at said opposite side in the longitudinal direction of said pin in the outer surface of said pin.

6. In a thread cutting device, in combination, a cutter block having a bore therein extending in one direction, said cutter block having in a wall portion thereof bounding said bore at least one notch extending through said wall portion into said bore, said wall portion being formed with a slot extending in the direction of said bore through said wall portion and across said notch, and into said bore and having a width smaller than the width of said bore; and a cutting pin slidably mounted in said bore for reciprocating movement along the same, and having an end surface traversing said notch during reciprocating movement of said cutting pin whereby a thread located in said notch and extending across said bore, is cut off by said cutting pin while thread fibers are pushed out through said slot.

7. In a thread cutting device, in combination, a cutter block having a bore therein extending in one direction, said cutter block having in a wall portion thereof bounding said bore at least one notch extending through said wall portion into said bore, said wall portion being formed with a slot extending in the direction of said bore through said wall portion and across said notch, and into said bore and having a width smaller than the width of said bore; and a cutting pin slidably mounted in said bore for reciprocating movement along the same, and having an end surface traversing said notch during reciprocating movement of said cutting pin whereby a thread located in said notch and extending across said bore, is cut off by said cutting pin while thread fibers are pushed out through said slot, said end surface of said cutting pin being inclined to the longitudinal direction of said bore and adapted to angularly deflect a thread engaged thereby, and the edge of said end surface trailing in the direction of the cutting movement of said pin cooperating with an edge of said wall portion along said notch to cut the thread.

8. In a thread cutting device, in combination, a cutter block having a bore therein extending in one direction, said cutter block having in a wall portion thereof bounding said bore at least one notch extending through said wall portion into said bore, said wall portion being formed with a slot extending in the direction of said bore through said wall portion and across said notch, and into said bore and having a width smaller than the width of said bore; and a cutting pin slidably mounted in said bore for reciprocating movement along the same, and having an end surface traversing said notch during reciprocating movement of said cutting pin whereby a thread located in said notch and extending across said bore, is cut off by said cutting pin while thread fibers are pushed out through said slot, said end surface of said cutting pin being formed with a groove adapted to receive a thread located in said notch, said groove having an inclined bottom so that the thread is cut during further movement of said cutting pin at the deeper end of said groove.

9. A thread cutting device comprising, in combination, a first cutter member having a guideway therein extending in one direction, said first cutter member having in the wall portions thereof bounding said guideway on opposite sides thereof notch means having edges transverse to said direction and extending across said guideway; and a second cutting member slidably mounted in said guideway for reciprocating movement along the same in said direction, and having an end surface traversing said notch means and edges during reciprocating movement of said second cutting member, said second cutting member being formed with a groove adapted to receive a thread located in said notch means, said groove having a portion extending in the lateral face of said second cutting member across one of said edges, and another portion extending in said end surface so that a thread received in said groove is angularly deflected and cut between the other edge of said notch means and the end of said groove portion in said end surface.

10. A thread cutting device as set forth in claim 9, wherein said groove portion in said end surface has an inclined bottom, the shallower end of said last mentioned groove portion opening into said first mentioned longitudinal extending groove portion, and a thread being cut at the deeper end of said groove portion of said end surface.

References Cited in the file of this patent

UNITED STATES PATENTS

| | | |
|---|---|---|
| 626,334 | McCarter | June 6, 1899 |
| 2,041,386 | Van Laanen | May 19, 1936 |
| 2,131,788 | Stevenson | Oct. 4, 1938 |
| 2,561,968 | Bosshard | July 24, 1951 |

FOREIGN PATENTS

| | | |
|---|---|---|
| 723,102 | Germany | July 29, 1942 |
| 1,049,319 | Germany | Jan. 22, 1959 |
| 771,424 | Great Britain | Apr. 3, 1957 |
| 60,928 | Sweden | Aug. 3, 1925 |